US008634767B2

(12) United States Patent
Rofougaran et al.

(10) Patent No.: US 8,634,767 B2
(45) Date of Patent: Jan. 21, 2014

(54) METHOD AND SYSTEM FOR UTILIZING EHF REPEATERS AND/OR TRANSCEIVERS FOR DETECTING AND/OR TRACKING AN ENTITY

(75) Inventors: Ahmadreza Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 630 days.

(21) Appl. No.: 11/865,005

(22) Filed: Sep. 30, 2007

(65) Prior Publication Data
US 2009/0088073 A1 Apr. 2, 2009

(51) Int. Cl.
*H04B 7/24* (2006.01)
(52) U.S. Cl.
USPC .................................. 455/9; 455/16; 455/17
(58) Field of Classification Search
None
See application file for complete search history.

(56) References Cited

U.S. PATENT DOCUMENTS

| 2002/0012336 | A1* | 1/2002 | Hughes et al. ............... 370/347 |
| 2002/0015397 | A1 | 2/2002 | Hughes et al. |
| 2007/0159991 | A1* | 7/2007 | Noonan et al. ............... 370/310 |

FOREIGN PATENT DOCUMENTS

| KR | 19990048907 | 6/2001 |
| WO | WO 2004/105273 | 12/2004 |
| WO | WO 2007/011697 | 1/2007 |
| WO | WO 2008/048059 | 4/2008 |

* cited by examiner

*Primary Examiner* — Philip Sobutka
(74) *Attorney, Agent, or Firm* — Farjami & Farjami LLP

(57) ABSTRACT

A plurality of repeater devices may utilize extreme high frequency (EHF) interface to detect and/or track entities that may be located within the plurality of repeater devices. Each of the plurality of repeater devices may transmit EHF signals that may enable identification of the transmitting repeater device. Identification of the transmitting repeater devise may comprise use of unique information and/or transmission parameters. Each of the plurality of repeater devices may determine characteristics of received EHF signals to enable determining presence and/or location of entities within the plurality of repeater devices. These characteristics may comprise identity of transmitting repeater devices, signal power, signal amplitude, delay of signal, and/or reception angle. Non-extremely high frequency (non-EHF) connections may be utilized within the plurality of repeater devices to coordinate and/or update detection and/or tracking of entities within the plurality of repeater devices.

24 Claims, 4 Drawing Sheets

METHOD AND SYSTEM FOR UTILIZING EHF REPEATERS AND/OR TRANSCEIVERS FOR DETECTING AND/OR TRACKING AN ENTITY

CROSS-REFERENCE TO RELATED APPLICATIONS/INCORPORATION BY REFERENCE

[Not Applicable].

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to wireless communication. More specifically, certain embodiments of the invention relate to a method and system for utilizing EHF repeaters and/or transceivers for detecting and/or tracking an entity.

BACKGROUND OF THE INVENTION

In 2001, the Federal Communications Commission (FCC) designated a large contiguous block of 7 GHz bandwidth for communications in the 57 GHz to 64 GHz spectrum. This frequency band was designated for use on an unlicensed basis, that is, the spectrum is accessible to anyone, subject to certain basic, technical restrictions such as maximum transmission power and certain coexistence mechanisms. The communications taking place in this band are often referred to as '60 GHz communications.' With respect to accessibility of this designated portion of the spectrum, 60 GHz communications is similar to other forms of unlicensed spectrum use, for example Wireless LANs (WLAN) or Bluetooth in the 2.4 GHz ISM bands. However, communications at 60 GHz may be significantly different in aspects other than accessibility. For example, 60 GHz signals may provide markedly different communications channel and propagation characteristics, at least due to the fact that 60 GHz radiation is partly absorbed by oxygen in the air, leading to higher attenuation with distance. On the other hand, since a very large bandwidth of 7 GHz is available, very high data rates may be achieved. Among the applications for 60 GHz communications are wireless personal area networks, wireless high-definition television signal, for example from a set top box to a display, or Point-to-Point links.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing EHF repeaters and/or transceivers for detecting and/or tracking an entity, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing EHF repeaters and/or transceivers for detecting and/or tracking an entity. A plurality of repeater devices may utilize an extreme high frequency (EHF) interface to detect and/or track entities that may be located within an area of the plurality of repeater devices. Each of the plurality of repeater devices may transmit EHF signals that may enable identification of the transmitting repeater device. Identification of the transmitting repeater devise may comprise use of unique information and/or transmission parameters. Each of the plurality of repeater devices may determine characteristics of received EHF signals to enable determining presence and/or location of entities within an area of the plurality of repeater devices. These characteristics may comprise identity of transmitting repeater devices, signal power, signal amplitude, delay of signal, and/or reception angle. Non-extremely high frequency (non-EHF) connections may be utilized within the plurality of repeater devices to coordinate and/or update detection and/or tracking of entities within an area of the plurality of repeater devices.

Figure 1:
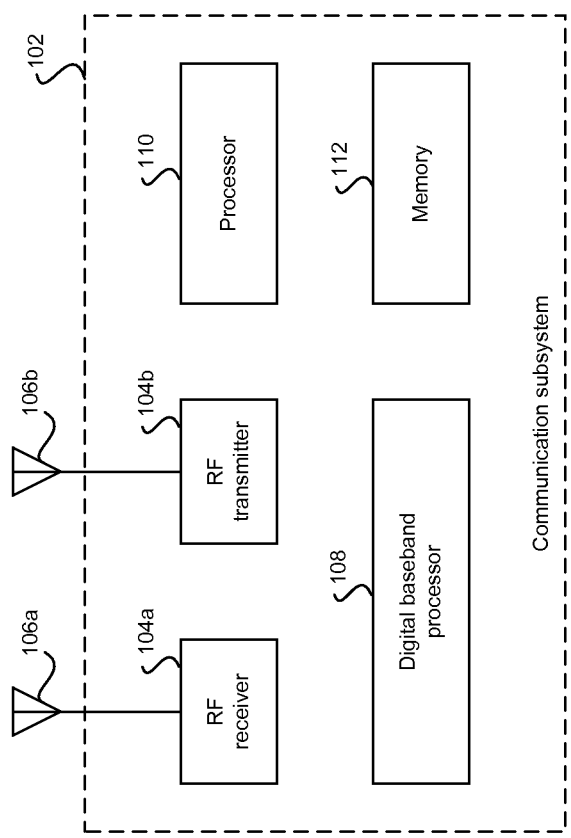
FIG. 1 is a block diagram illustrating an exemplary communication subsystem, in accordance with an embodiment of the invention.

FIG. 1 is a block diagram illustrating an exemplary communication subsystem, in accordance with an embodiment of the invention. Referring to FIG. 1, there is shown a communication subsystem 102, an RF receiver 104a, an RF transmitter 104b, a receive antenna 106a, a transmit antenna 106b, a digital baseband processor 108, a processor 110, and a memory 112.

The communication subsystem 102 may comprise the RF receiver 104a, the RF transmitter 104b, the receive antenna 106a, the transmit antenna 106b, the digital baseband processor 108, the processor 110, the memory 112, and may also comprise additional suitable logic, circuitry, and/or code that may enable receiving, transmitting, and processing of RF signals. For example, the communication subsystem 102 may be integrated or located within a wireless device to enable operations in a wireless system, such as the cellular network and/or digital video broadcast network.

The receive antenna 106a may comprise suitable logic, circuitry, and/or code that may enable reception of RF signals; receive antenna 106a may be communicatively coupled to the RF receiver 104a. The RF receiver 104a may comprise suitable logic, circuitry, and/or code that may enable processing of received RF signals. The RF receiver 104a may enable receiving extremely high frequency (EHF) signals at, for example, approximately 60 GHz. In this regard, the RF receiver 104a may be enabled to generate signals, such as local oscillator signals, for the reception and processing of EHF signals. The RF receiver 104a may down-convert received RF signals to a baseband frequency signal. The RF receiver 104a may perform direct down-conversion of the received RF signals to a baseband frequency signal, for example. In some instances, the RF receiver 104a may enable analog-to-digital conversion of the baseband signal components before transferring the components to the digital baseband processor 108. In other instances, the RF receiver 104a may transfer the baseband signal components in analog form. The receive antenna 106a and the RF receiver 104a may also enable reception of non-EHF RF signals. For example, the receive antenna 106a and the RF receiver 104a may enable receiving and/or processing of Bluetooth RF signals.

The transmit antenna 106b may comprise suitable logic, circuitry, and/or code that may enable transmission of RF signals; the transmit antenna 106b may be communicatively coupled to the RF transmitter 104b. The RF transmitter 104b may comprise suitable logic, circuitry, and/or code that may enable processing of RF signals for transmission. The RF transmitter 104b may enable transmission of extremely high frequency (EHF) signals at, for example, approximately 60 GHz. In this regard, the RF transmitter 104b may be enabled to generate signals, such as local oscillator signals, for the transmission and processing of EHF signals. The RF transmitter 104b may up-convert the baseband frequency signal to an RF signals. The RF transmitter 104b may perform direct up-conversion of the baseband frequency signal to a RF signals of approximately 60 GHz, for example. In some instances, the RF transmitter 104b may enable digital-to-analog conversion of the baseband signal components received from the digital baseband processor 108 before up conversion. In other instances, the RF transmitter 104b may receive baseband signal components in analog form. The transmit antenna 106b and the RF transmitter 104b may also enable transmission of non-EHF RF signals. For example, the transmit antenna 106b and the RF transmitter 104b may enable transmitting and/or processing of Bluetooth RF signals.

The digital baseband processor 108 may comprise suitable logic, circuitry, and/or code that may enable processing and/or handling of baseband frequency signals. In this regard, the digital baseband processor 108 may process or handle signals received from the RF receiver 104a and/or signals to be transferred to the RF transmitter 104b. The digital baseband processor 108 may also provide control and/or feedback information to the RF receiver 104a and to the RF transmitter 104b based on information from the processed signals. The digital baseband processor 108 may communicate information and/or data from the processed signals to the processor 110 and/or to the memory 112. Moreover, the digital baseband processor 108 may receive information from the processor 110 and/or to the memory 112, which may be processed and transferred to the RF transmitter 104b for transmission to the network.

The processor 110 may comprise suitable logic, circuitry, and/or code that may enable control and/or data processing operations for the communication subsystem 102. The processor 110 may be utilized to control at least a portion of the RF receiver 104a, the RF transmitter 104b, the digital baseband processor 108, and/or the memory 112. In this regard, the processor 110 may generate at least one signal for controlling operations within the communication subsystem 102. The processor 110 may also enable executing of applications that may be utilized by the communication subsystem 102. For example, the processor 110 may execute applications that may enable displaying and/or interacting with content received via RF signals in the communication subsystem 102.

The memory 112 may comprise suitable logic, circuitry, and/or code that may enable storage of data and/or other information utilized by the communication subsystem 102. For example, the memory 112 may be utilized for storing processed data generated by the digital baseband processor 108 and/or the processor 110. The memory 112 may also be utilized to store information, such as configuration information, that may be utilized to control the operation of at least one block in the communication subsystem 102. For example, the memory 112 may comprise information necessary to configure the RF receiver 104a to enable receiving signals in the appropriate frequency band.

In operation, the communication subsystem 102 may enable communication via RF interfaces. The communication subsystem 102 may be integrated within a wireless device to enable communication via an EHF interface, for example the 60 GHz band. For example, the communication subsystem 102 may receive RF signals operating in the 60 GHz band via the receive antenna 106a; wherein the RF receiver 104a may enable initial processing of the received signal. The communication subsystem 102 may transmit RF signals operating in the 60 GHz band via the RF transmitter 104b and the transmit antenna 106b. The digital baseband processor 108, the processor 110, and the memory 112 may enable performing control and/or related operation during transmission and/or reception of RF signals. For example, the memory 112 may be utilized to store and/or fetch data that may be received and/or transmitted via 60 GHz RF signals. The digital 108 may enable performing signal processing operation such as analog-to-digital conversion, encoding/decoding of received and/or transmitted data via the 60 GHz RF signals. The processor 110 may enable controlling of the operations of the communication subsystem 102. For example, the processor 110 may enable operating of the transmit and/or the receive antennas to enable aligning during 60 GHz RF communications.

In addition to EHF communications, which may have limited operational range compared with lower frequency RF interfaces, the communication subsystem 102 may be enabled to utilize other wireless interfaces and/or protocols. For example, the communication subsystem 102 may be enabled to utilize such wireless interfaces as Bluetooth to perform Bluetooth RF communications. Accordingly, the receive antenna 106a, the RF receiver 104a, and/or other components within the communication subsystem 102 may enable reception of non-EHF RF signals, for example, Bluetooth RF signals. Similarly, the transmit antenna 106b, the RF transmitter 104b, and/or other components within the communication subsystem 102 may enable transmission of non-EHF RF signals, for example, Bluetooth RF signals. The non-EHF interfaces that may be supported in the communication subsystem 102 may be utilized to send information regarding the communication subsystem 102. For example, a Bluetooth connection may be utilized to send information regarding the capability of the communication subsystem 102 and/or to receive messages containing information regarding preferred setting that may be utilized while performing EHF communication.

In an embodiment of the invention, repeater devices may be utilized to extend the range of EHF communication between wireless devices that may comprise the communication system 100. EHF communication may generally have limited range, typically operating only in "line-of-sight" settings. Consequently, it may be desirable to utilize other devices, for example, repeater devices, to extend the range of communication between EHF-enabled devices. Additionally, because utilizing a single repeater device may not yield substantial increase in the range of EHF RF communication, a group of repeater devices, forwarding EHF RF signal in chain-like configuration, may be utilized.

The repeater device may comprise communication systems substantially similar to the communication system 100, to enable performing transmission and reception of EHF signals. The small wavelength of EHF signals may enable use of EHF device to perform remote sensing, wherein an EHF-enabled device may utilize EHF signals, in the form of millimeter beams for example, to detect and/or tracks entities that may be located in vicinity of the EHF-enabled devices. Consequently, a plurality of EHF repeaters, which may be utilized in forwarding EHF signals between wireless devices, may also be enabled to utilize EHF beams to detect and/or track entities that may exist among the plurality of EHF repeaters. Each of the plurality of repeater devices my utilize the communication system 100 to perform remote sensing, wherein the transmit antenna 106b, the receive antenna 106b, and the communication subsystem 102 may be utilized to transmit, receive, and process EHF signals to enable detection and/or tracking of objects in the vicinity of each of the plurality of repeater devices based on EHF signals, wherein presence of such object may be ascertained based on reception of echo signals of transmitted EHF signals, for example.

Figure 2:
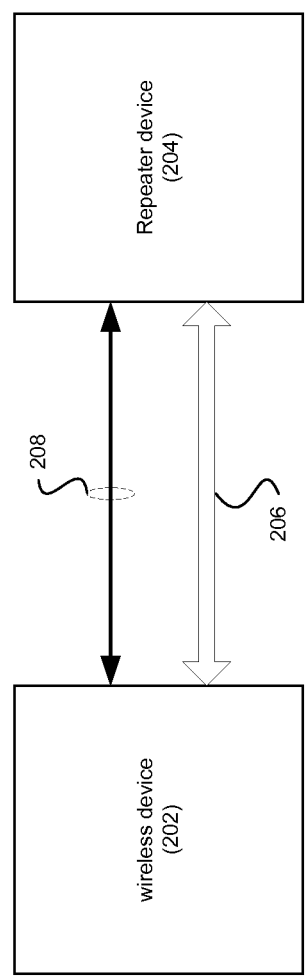
FIG. 2 is a block diagram illustrating a repeater device utilized to forward EHF RF communication between two wireless devices, in accordance with an embodiment of the invention.

FIG. 2 is a block diagram illustrating a repeater device utilized to forward 60 GHz communication between two wireless devices, which may be utilized in accordance with an embodiment of the invention. Referring to FIG. 2, there is shown a wireless device 202, a repeater device 204, an EHF connection 206, and a control connection 208.

The wireless device 202 may each comprise suitable logic, circuitry, and/or code that may enable receiving, transmitting, and processing of RF signals. For example, the wireless device 202 may comprise the communication subsystem 102, substantially as described in FIG. 1.

The repeater device 204 may comprise suitable logic, circuitry, and/or code that may enable reception and/or transmission of EHF signals to facilitate forwarding EHF signals transmitted by the wireless device 202. Additionally, the repeater device 204 may comprise suitable logic, circuitry, and/or code that may enable establishing and/or utilizing control connection 208 with the wireless device 202.

The EHF connection 206 may comprise a radio (RF) and/or wireless link that may be based on an EHF protocol that may comprise the 60 GHz interface. The control connection 208 may comprise a radio (RF) and/or wireless link that may be based on a non-EHF protocol that may comprise Bluetooth, ZigBee, and/or WiFi. The control connection 208 may be utilized to communicate control messages, for example, between the wireless device 202 and the repeater device 204.

In operation, the repeater device 204 may enable forwarding EHF RF signals transmitted and/or received by the wireless device 202 via the EHF connection 206. EHF communication may generally have limited range, typically operating only in "line-of-sight" settings. Consequently, it may desirable to utilize other devices, for example, repeater devices such as the repeater device 204, to extend the range of communication between EHF-enabled devices.

The wireless device 202 may utilize the communication subsystem 102 to enable transmission and/or reception of EHF RF signals via the EHF connection 206. The repeater device 204 may be utilized because EHF RF signals may have limited operational range. The wireless device 202, and/or the repeater device 204 may utilize the control connection 208 during EHF communication between devices. The control connections 208 may enable exchanging control messages, data, and/or information that may enable facilitating EHF communication via the EHF connection 206. For example, the control connection 208 may enable the wireless device 202 to determine whether the repeater device 204 may be utilized to forward EHF RF signal transmitted by wireless device 202. Alternatively, the repeater device 204 may utilize the control connection 206 to notify the wireless device 202 of an impending EHF communication targeted for the wireless device 202.

While it may be desirable to utilize the repeater device 204 in forwarding EHF RF signals transmitted and/or receive by the wireless device 202, the operational effectiveness of the repeater device 204 may be limited by the operational limitations of EHF communication since the main purpose for utilizing the repeater device 204 may be receiving and transmitting EHF RF signals. Consequently, it may be desirable to utilize a plurality of repeater devices, similar to the repeater device 204, which may be enabled, in their totality, to provided substantial increase of the EHF communication range of the wireless device 202.

The small wavelength of EHF signals may enable use of EHF-enabled device to perform remote sensing, wherein an EHF-enabled device may utilize EHF signals, in the form of millimeter beams for example, to detect and/or tracks entities that may maybe located in vicinity of the EHF-enabled devices. Consequently, a plurality of EHF repeaters, each substantially similar to the repeater device 204, may also be enabled to utilize EHF beams to detect and/or track entities that may exist among the plurality of EHF repeaters, substantially as described in FIG. 1.

Figure 3:
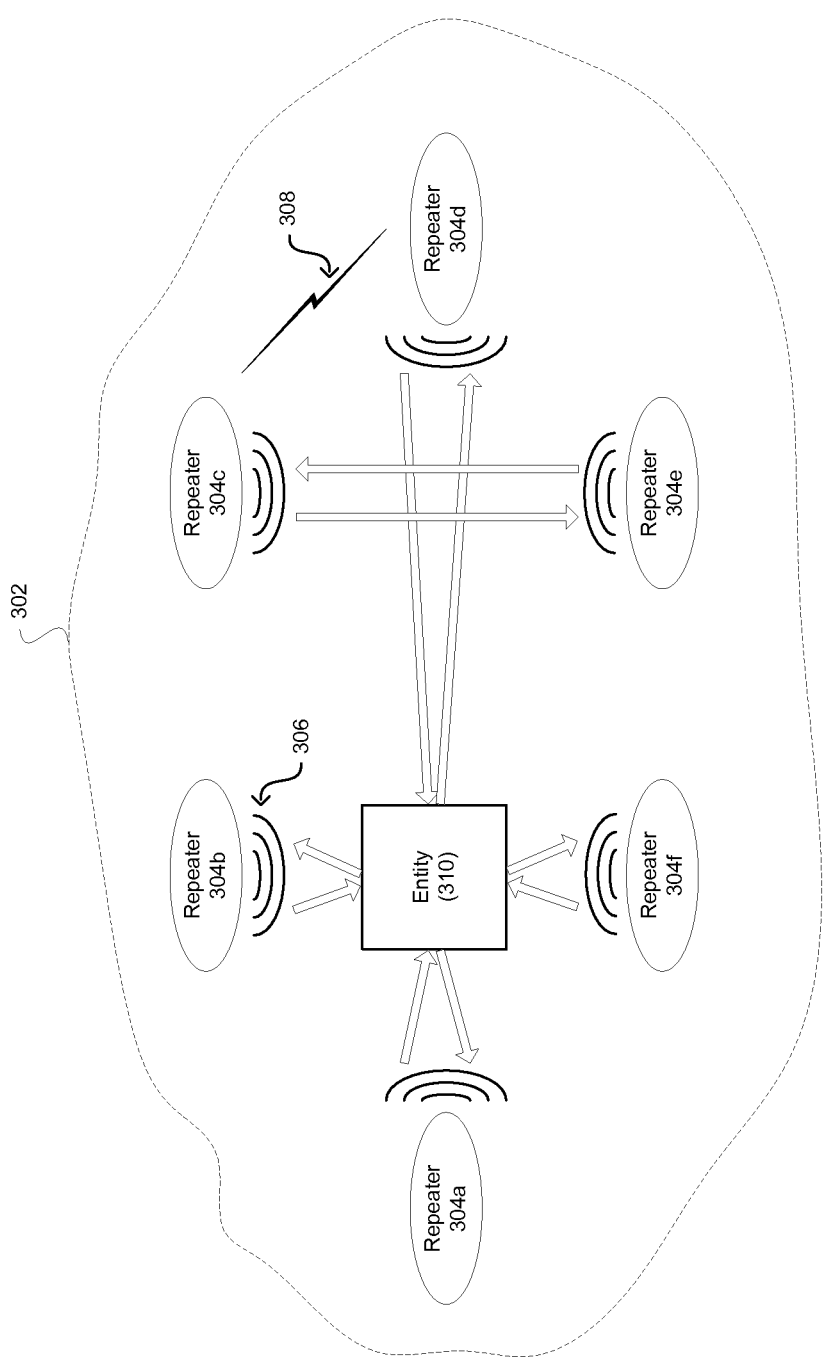
FIG. 3 is a block diagram illustrating a plurality of EHF repeaters that utilize EHF signals to track and/or detect entities located among the EHF repeaters, in accordance with an embodiment of the invention.

FIG. 3 is a block diagram illustrating a plurality of EHF repeaters that utilize EHF signals to track and/or detect entities located among the EHF repeaters, which may be utilized in accordance with an embodiment of the invention. Referring to FIG. 3, there is shown, a repeater ad hoc network 302, plurality of EHF repeater devices 304a, 304b, 304c, 304d, 304e, and 304f, an EHF interface 306, and a control connection 308, and an entity 310.

The repeater ad hoc network 302 may comprise a plurality of EHF repeater devices, for example, the plurality of EHF repeater devices 304a, 304b, 304c, 304d, 304e, and 304f, and may comprise suitable logic, circuitry, and/or code that may enable the plurality of EHF repeater devices 304a, 304b, 304c, 304d, 304e, and 304f to track and/or detect one or more objects that may be located within the repeater ad hoc network 302.

Each of the plurality of EHF repeater devices 304a, 304b, 304c, 304d, 304a, and 304f may comprise suitable logic, circuitry, and/or code that may enable reception and/or transmission of EHF signals, and may be utilized to facilitate forwarding EHF RF signals between EHF-enabled devices. For example, each of the plurality of repeater devices 304a, 304b, 304c, 304d, 304e, and 304f may be comprised substantially similar to the repeater device 204, as described in FIG. 2. Additionally, each of the plurality of repeater devices 304a, 304b, 304c, 304d, 304a, and 304f may be enabled to utilize transmission and/or reception of EHF signals to perform such operation as remote sensing wherein EHF signals may be transmitted and/or received to track and/or detect nearby objects.

The EHF interface 306 may comprise EHF RF signals transmitted and/or received by each of the plurality of repeater devices 304a, 304b, 304c, 304d, 304e, and 304f. For example, the EHF interface 306 may comprise a 60 GHz interface. The control connection 308 may comprise a radio frequency (RF) and/or wireless link that may be based on a non-EHF protocol that may comprise Bluetooth, ZigBee, and/or WiFi. Each of the plurality of repeater devices 304a, 304b, 304c, 304d, 304e, and 304f may control connection 208 may utilized the control connection 308 to communicate information and/or control messages with other repeater devices, for example, between the repeater devices 304b and 304f.

The entity 310 may comprise any physical object that may be located among the plurality of EHF repeater devices 304a, 304b, 304c, 304d, 304e, and 304f. The entity 310 may not be enabled to perform RF transmission and/or reception, especially EHF communication.

In operation, the plurality of EHF repeater devices 304a, 304b, 304c, 304d, 304e, and 304f may utilize EHF interface 306 to detect and/or track entities, for example entity 310, that may be located within the repeater ad hoc network 302. The small wavelength of EHF signals may enable each of the plurality of EHF repeater devices 304a, 304b, 304c, 304d, 304e, and 304f to utilize EHF signals to perform remote sensing-like operations, wherein EHF signals, in the form of millimeter beams for example, may be transmitted and/or received to enable detecting and/or tracking the entity 310. For example, the repeater device 304a may transmit EHF signals, and may ascertain a presence of one or more entity, for example the entity 310, in its vicinity based on reception of echo signals of the transmitted EHF signals, which that may "bounce" off the entity 310.

Each of the plurality of EHF repeater devices 304a, 304b, 304c, 304d, 304e, and 304f may transmit EHF signals with unique characteristics compared with the other EHF repeater devices in the plurality. For example, EHF signals transmitted by each of the plurality of EHF repeater devices 304a, 304b, 304c, 304d, 304e, and 304f may encode identity information in the EHF signal transmitted that is unique to the transmitting repeater device, and/or utilize a slightly different frequency compared to other devices in the repeater ad hoc network 302. Additionally, repeater devices within the repeater ad hoc network 302 may utilize control connection, for example control connection 308, to enable the repeater devices to coordinate the unique characteristics of their transmitted beaming EHF signals, and/or to exchange information regarding entities that may be located within the plurality of repeater devices. In instances where the repeater devices may be enabled to receive EHF signals transmitted by other repeater devices in the repeater ad hoc network 302, the receiving repeater device may determine that there may not be entities between the receiving repeater device and the transmitting repeater device. For example, referring to FIG. 3, the EHF repeater device 304c may determine, based on identifying characteristics, that it may be receiving EHF signals transmitted by the EHF repeater device 304e.

Similarly, the EHF repeater device 304e may determine, based on identifying characteristics, that it may be receiving EHF signals transmitted by the EHF repeater device 304c. Consequently, both repeater devices 304c and 304e may determine that there may not be any entities located between the two EHF repeater devices. On the other hand, where repeater devices receive back EHF signals transmitted by them in the repeater ad hoc network 302, the receiving repeater device may determine that entities may be present between the receiving repeater device and other repeater devices in the repeater ad hoc network 302. For example, referring to FIG. 3, each of the EHF repeater devices 304a, 304b, 304d, and 304f may determine, based on identifying characteristics in received EHF signals, that the repeater device may be receiving an "echo" of its own transmitted EHF signals. Consequently, the repeater devices 304a, 304b, 304d, and 304f may determine the presence of the entity 310. Additionally, once the presence of the entity 310 may be ascertained based on reception of echo EHF signals, each of the repeater devices 304a, 304b, 304d, and 304f may determine characteristics of received EHF signals to enable determining specific information about the location of the entity 310. For example, each of the repeater devices 304a, 304b, 304d, and 304f may utilize such techniques as power loss, time delay between transmission of EHF beam signals and reception of echo EHF signals, and/or angle variations between transmission of EHF beam signals and reception of echo EHF signals to enable determining precise location of the entity 310.

In an embodiment of the invention, the plurality of repeater devices 304a, 304b, 304c, 304d, 304e, and 304f may utilize control connection to coordinate detection and/or tracking of entities located within the repeater ad hock network 302. For example, once the presence and/or location of the entity 310 has been determined, the repeater devices may utilize non-EHF control connections similar to control connection 308, to update other repeaters devices with information regarding presence and/or location of the entity 310. Utilization of such control connection may enable each of the plurality of EHF repeaters 304a, 304b, 304c, 304d, 304e, and 304f to maintain present information about entities that may be present within the repeater ad hoc network 302. Such information may be utilized while determining available routes for forwarding EHF communication via the repeater ad hoc network 302, for example.

Figure 4:
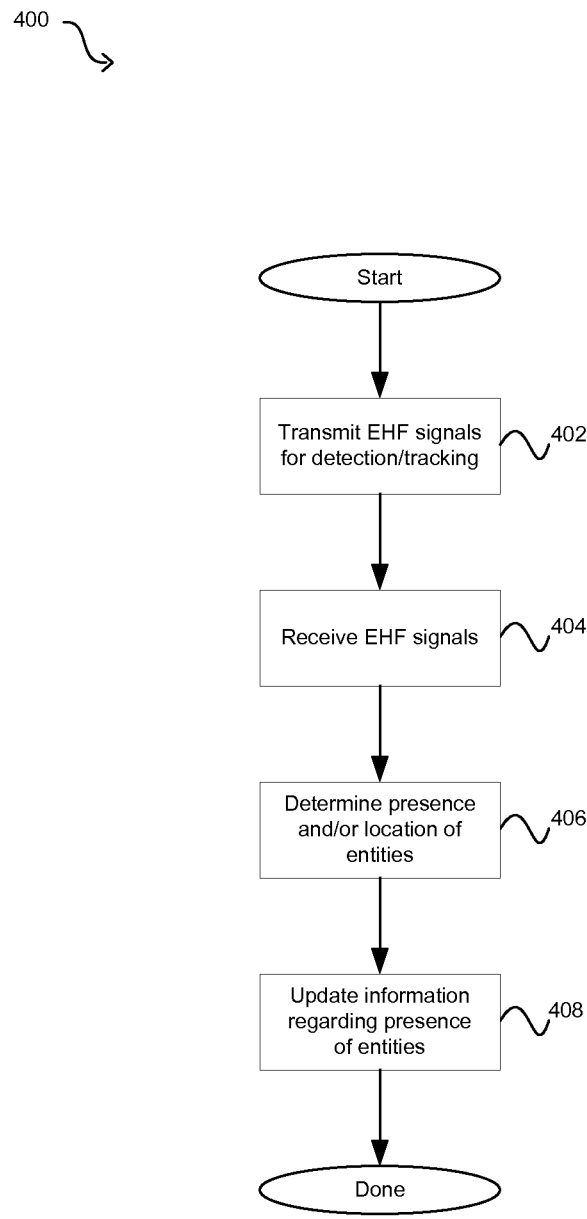
FIG. 4 is an exemplary flow diagram illustrating a plurality of EHF repeaters that utilize EHF signals to track and/or detect entities located among the EHF repeaters, in accordance with an embodiment of the invention.

FIG. 4 is an exemplary flow diagram illustrating a plurality of EHF repeaters that utilize EHF signals to track and/or detect entities located among the EHF repeaters, in accordance with an embodiment of the invention. Referring to FIG. 4, there is shown a flow chart 400 comprising a plurality of exemplary steps. In step 402, each of a plurality of repeater devices may transmit EHF beam signals that may enable detecting and/or tracking entities that may be located within the plurality of repeater devices. For example, each of the plurality of EHF repeater devices 304a, 304b, 304c, 304d, 304e, and 304f may transmit EHF signals that may enable detecting and/or tracking entities, for example entity 310, that may be location within the repeater ad hoc network 310. Additionally, EHF signals transmitted by each of the plurality of repeater devices may enable identification of the transmitting repeater device by utilizing unique characteristics compared with the other EHF repeater devices. For example, plurality of EHF repeater devices 304a, 304b, 304c, 304d, 304e, and 304f may encode identity information in the EHF signal transmitted that is unique to the transmitting repeater device, and/or utilize a slightly different frequency compared to other devices in the repeater ad hoc network 302.

In step 404, each of a plurality of repeater devices may receive EHF signals that may enable detecting and/or tracking entities that may be located within the plurality of repeater devices. For example, each of the plurality of EHF repeater devices 304a, 304b, 304c, 304d, 304e, and 304f may receive EHF signals that may enable detecting and/or tracking entities. Identification information, which may be incorporated into transmitted beaming EHF signals in the plurality of repeater devices, may enable receiving repeater devices to determine the identity of the transmitting repeater device.

In step 406, presence and/or location of entities that may be located within the plurality of repeater devices may be determined. For example, where a repeater device may determine based on identification information that received EHF signals were transmitted by other repeater devices, the receiving repeater device may determine that entities may not be present between it and repeater devices that transmitted received EHF signals. Alternatively, reception of echo EHF signals for EHF signal transmitted by the repeater device itself may enable determining presence and/or location of entities within the plurality of repeater devices, substantially as described in FIG. 3.

In step 408, repeater devices may update other repeater devices in a plurality of repeater devices regarding presence and/or location of entities located within the plurality of repeater devices. For example, each of the plurality of repeater devices 304a, 304b, 304c, 304d, 304e, and 304f may utilize control connections to updates other EHF repeater devices with information pertaining to detection and/or tracking of entities located within the repeater ad hock network 302. Once the presence and/or location of the entity 310 may be determined, the repeater devices may utilize non-EHF control connections, which may be similar to control connection 308, to update other repeaters devices with information regarding presence and/or location of the entity 310.

Various embodiments of the invention may comprise a method and system for utilizing EHF repeaters and/or transceivers for detecting and/or tracking an entity. The plurality of repeater devices 304a, 304b, 304c, 304d, 304e, and 304f may utilize extreme high frequency (EHF) interface 306 to detect and/or track entities that may be located within the repeater ad hoc network 302. Each of the plurality of repeater devices 304a, 304b, 304c, 304d, 304e, and 304f may transmit EHF signals that may enable identification of the transmitting repeater device. Identification of the transmitting EHF repeater devise may comprise use of unique information and/or transmission parameters. Each of the plurality of repeater devices 304a, 304b, 304c, 304d, 304e, and 304f may determine characteristics of received EHF signals to enable determining presence and/or location of entities within the repeater ad hoc network 302. These characteristics may comprise identity of transmitting repeater devices, signal power, signal amplitude, delay of signal, and/or reception angle. Non-extremely high frequency (non-EHF) connections may be utilized within the repeater ad hoc network 302 to coordinate and/or update detection and/or tracking of entities within the repeater ad hoc network 302.

In an embodiment of the invention, a repeater device that extends a range of extremely high frequency (EHF) signals, for example 304a, may be enabled to detect and/or track, via EHF signals, one or more entities, for example entity 310, located among one or more of a plurality of repeater devices comprising the repeater device 304a, for example the plurality of repeater devices 304a, 304b, 304c, 304d, 304e, and 304f. The repeater device 302a and each of the repeater devices 304b, 304c, 304d, 304e, and 304f may transmit EHF signals that may enable identification of the transmitting repeater device. Identification of the transmitting EHF repeater devise may comprise use of unique information and/or transmission parameters. The repeater device 302a and each of the repeater devices 304b, 304c, 304d, 304e, and 304f may determine characteristics of received EHF signals to enable determining presence and/or location of entities within the plurality of repeater devices. These characteristics may comprise identity of transmitting repeater devices, signal power, signal amplitude, delay of signal, and/or reception angle. Non-extremely high frequency (non-EHF) connections may be utilized to enable the repeater device 302a and the repeater devices 304b, 304c, 304d, 304e, and 304f to coordinate and/or update detection and/or tracking of entities within the plurality of repeater devices.

Another embodiment of the invention may provide a machine-readable storage, having stored thereon, a computer program having at least one code section executable by a machine, thereby causing the machine to perform the steps as described herein for utilizing EHF repeaters and/or transceivers for detecting and/or tracking an entity.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wireless communication, the method comprising:
   in a repeater device that extends a range of extremely high frequency (EHF) signals:
   incorporating identification information of said repeater device into EHF signals transmitted by said repeater device to enable identifying said repeater device;
   detecting and/or tracking based on EHF signals received by said repeater device, presence and/or movement of one or more entities located among one or more of a plurality of repeater devices comprising said repeater device;
   separating communication of said EHF signals from control of said EHF signals by utilizing non-extremely high frequency (non-EHF) connections to communicate control messages among said plurality of repeater devices for controlling said EHF signals;
   wherein said detecting and/or tracking comprises determining identification information of transmitting repeater devices from said received EHF signals to identify said transmitting repeater devices.

2. The method according to claim. 1, wherein said extremely high frequency (EHF) signals comprise 60 GHz signals.

3. The method according to claim 1, comprising transmitting unique EHF signals by each of said plurality of repeater devices to enable identification of each of said plurality of repeater devices while performing said detection and/or tracking.

4. The method according to claim 1, comprising determining characteristics of said EHF signals received in each of said plurality of repeater devices and said repeater device to enable performing said detection and/or tracking.

5. The method according to claim 4, wherein said determined characteristics of said EHF signals received in each of said plurality of repeater devices and said repeater device comprise signal power, signal amplitude, delay of signal, and/or reception angle.

6. The method according to claim 1, comprising utilizing triangulation, via said EHF signals, to enable determining location of said one or more entities.

7. The method according to claim 1, comprising utilizing said non-EHF connections among said plurality of repeater devices to coordinate said detection and/or tracking.

8. The method according to claim 1, wherein said non-EHF connections comprise one or more of Bluetooth, ZigBee, WiFi, and/or ultra-wideband (UWB).

9. A machine-readable storage having stored thereon, a computer program having at least one code section for wireless communication, the at least one code section being executable by a machine for causing the machine to perform steps comprising:
   in a repeater device that extends a range of extremely high frequency (EHF) signals:
   incorporating identification information of said repeater device into EHF signals transmitted by said repeater device to enable identifying said repeater device;
   detecting and/or tracking based on EHF signals received by said repeater device, presence and/or movement of one or more entities located among one or more of a plurality of repeater devices comprising said repeater device;
   separating communication of said EHF signals from control of said EHF signals by utilizing non-extremely high frequency (non-EHF, connections to communicate control messages among said plurality of repeater devices for controlling said EHF signals;
   wherein said detecting and/or tracking comprises determining identification information of transmitting repeater devices from said received EHF signals to identify said transmitting repeater devices.

10. The machine-readable storage according to claim 9, wherein said extremely high frequency (EHF) signals comprise 60 GHz signals.

11. The machine-readable storage according to claim 9, wherein said at least one code section comprises code for transmitting unique EHF signals by each of said plurality of repeater devices to enable identification of each of said plurality of repeater devices while performing said detection and/or tracking.

12. The machine-readable storage according to claim 9, wherein said at least one code section comprises code for determining characteristics of said EHF signals received in each of said plurality of repeater devices and said repeater device to enable performing said detection and/or tracking.

13. The machine-readable storage according to claim 12, wherein said determined characteristics of said EHF signals received in each of said plurality of repeater devices and said repeater device comprise signal power, signal amplitude, delay of signal, and/or reception angle.

14. The machine-readable storage according to claim 9, wherein said at least one code section comprises code for utilizing triangulation, via said EHF signals, to enable determining location of said one or more entities.

15. The machine-readable storage according to claim 9, wherein said at least one code section comprises code for utilizing said non-EHF connections among said plurality of repeater devices to coordinate said detection and/or tracking.

16. The machine-readable storage according to claim 9, wherein said non-EHF connections comprise one or more of Bluetooth, ZigBee, WiFi, and/or ultra-wideband (UWB).

17. A system for wireless communication, the system comprising:
   one or more circuits in a repeater device that extends a range of extremely high frequency (EHF) signals:
   incorporating identification information of said repeater device into EHF signals transmitted by said repeater device to enable identifying said repeater device;
   detecting and/or tracking based on EHF signals received by said repeater device, presence and/or movement of one or more entities located among one or more of a plurality of repeater devices comprising said repeater device;
   separating communication of said EHF signals from control of said EHF signals by utilizing non-extremely high frequency (non-EHF) connections to communicate control messages among said plurality of repeater devices for controlling said EHF signals;
   wherein said detecting and/or tracking comprises determining identification information of transmitting repeater devices from said received EHF signals to identify said transmitting repeater devices.

18. The system according to claim 17, wherein said extremely high frequency (EHF) signals comprise 60 GHz signals.

19. The system according to claim 17, wherein said one or more circuits enable transmission of unique EHF signals by each of said plurality of repeater devices to enable identification of each of said plurality of repeater devices while performing said detection and/or tracking.

20. The system according to claim 17, wherein said one or more circuits enable determination of characteristics of EHF signals received in each of said plurality of repeater devices and said repeater device to enable performing said detection and/or tracking.

21. The system according to claim 20, wherein said determined characteristics of said EHF signals received in each of said plurality of repeater devices and said repeater device comprise signal power, signal amplitude, delay of signal, and/or reception angle.

22. The system according to claim 17, wherein said one or more circuits enable utilization of triangulation, via said EHF signals, to enable determination of location of said one or more entities.

23. The system according to claim 17, wherein said one or more circuits enable utilization of said non-EHF connections among said plurality of repeater devices to coordinate said detection and/or tracking.

24. The system according to claim 17, wherein said non-EHF connections comprise one or more of Bluetooth, ZigBee, WiFi, and/or ultra-wideband (UWB).

* * * * *